(12) United States Patent
Galsim et al.

(10) Patent No.: US 9,931,591 B2
(45) Date of Patent: Apr. 3, 2018

(54) METHOD AND SYSTEM FOR DETECTING DUST ACCUMULATION IN A HVAC FILTERING SYSTEM

(71) Applicant: SCHNEIDER ELECTRIC IT CORPORATION, West Kingston, RI (US)

(72) Inventors: Marlon Galsim, Shanghai (CN); Marlowe Dulaca Apuhin, Antipolo (PH)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 0 days.

(21) Appl. No.: 15/025,831

(22) PCT Filed: Sep. 30, 2013

(86) PCT No.: PCT/CN2013/084728
§ 371 (c)(1),
(2) Date: Mar. 29, 2016

(87) PCT Pub. No.: WO2015/042960
PCT Pub. Date: Apr. 2, 2015

(65) Prior Publication Data
US 2016/0243486 A1    Aug. 25, 2016

(51) Int. Cl.
*B03C 3/09* (2006.01)
*B03C 3/66* (2006.01)
(Continued)

(52) U.S. Cl.
CPC ......... *B01D 46/0086* (2013.01); *B01D 46/46* (2013.01); *F24F 11/0086* (2013.01); *F24F 13/28* (2013.01); *F24F 2011/0093* (2013.01)

(58) Field of Classification Search
CPC .............. B03C 3/09; B03C 3/66; B03C 3/155
(Continued)

(56) References Cited

U.S. PATENT DOCUMENTS 5,364,458 A * 11/1994 Burnett ................... B03C 3/155
                                                                    55/496
5,846,302 A * 12/1998 Putro ......................... B03C 3/66
                                                                    96/66
(Continued)

FOREIGN PATENT DOCUMENTS

CN         2152175 Y       1/1994
CN         1603835 A       4/2005
(Continued)

OTHER PUBLICATIONS

Notification of Transmittal of the International Search Report and the Written Opinion of the International Searching Authority from corresponding PCT/CN2013/084728 dated Jan. 23, 2014.

*Primary Examiner* — Frank Lawrence, Jr.
*Assistant Examiner* — Minh-Chau Pham
(74) *Attorney, Agent, or Firm* — Lando & Anastasi, LLP (57) ABSTRACT

A capacitive sensor system for detecting accumulation of dust in a filter of a HVAC system includes a first conductive mesh, a second conductive mesh, a first filter media disposed between the first conductive mesh and the second conductive mesh, and a circuit configured to measure a capacitance of a first capacitive sensor formed by the first conductive mesh, second conductive mesh, and the first filter media. The circuit further is configured to translate a measured capacitance to a dust level indicator frequency that is used to determine a frequency corresponding to level of dust.

19 Claims, 3 Drawing Sheets

(51) Int. Cl.
*B03C 3/155* (2006.01)
*B01D 46/00* (2006.01)
*F24F 13/28* (2006.01)
*B01D 46/46* (2006.01)
*F24F 11/00* (2018.01)

(58) Field of Classification Search
USPC .............................. 55/DIG. 34; 96/66, 80, 99
See application file for complete search history.

(56) References Cited

U.S. PATENT DOCUMENTS

| | | | |
|---|---|---|---|
| 6,099,726 A * | 8/2000 | Gembolis | B01D 29/21 210/243 |
| 6,989,049 B2 * | 1/2006 | Belson | B03C 3/36 422/121 |
| 7,129,847 B2 | 10/2006 | Right et al. | |
| 2006/0272504 A1 | 12/2006 | Nutsos | |
| 2008/0041138 A1 * | 2/2008 | Marra | B60H 1/008 73/31.02 |
| 2014/0205495 A1 * | 7/2014 | Ota | A61L 9/22 422/4 |

FOREIGN PATENT DOCUMENTS

| | | |
|---|---|---|
| CN | 1994522 A | 7/2007 |
| JP | 3124189 B2 | 1/2001 |
| KR | 20070072787 A | 7/2007 |

* cited by examiner

METHOD AND SYSTEM FOR DETECTING DUST ACCUMULATION IN A HVAC FILTERING SYSTEM

CROSS-REFERENCE TO RELATED APPLICATIONS

This application is a U.S. National Stage Application under 35 U.S.C. § 371 of International Application No. PCT/CN2013/084728, filed Sep. 30, 2013, titled METHOD AND SYSTEM FOR DETECTING DUST ACCUMULATION IN A HVAC FILTERING SYSTEM, which is hereby incorporated herein by reference in its entirety.

BACKGROUND

1. Technical Field

Aspects and embodiments of the present disclosure relate to systems and methods for detecting the buildup of dust in HVAC filtering systems.

2. Discussion of Related Art Heating, ventilation, and air conditioning (HVAC) systems are commonly used to distribute heated or cooled air throughout closed environments, for example, commercial or residential buildings or vehicles. In addition to heating and/or cooling equipment, HVAC systems often include filters for removing undesirable particulates from air circulated through the system.

SUMMARY

In accordance with one aspect, there is provided capacitive sensor system for detecting accumulation of dust in a filter of a HVAC system. The sensor system comprises a first conductive mesh, a second conductive mesh, a first filter media disposed between the first conductive mesh and the second conductive mesh, and a circuit configured to measure a capacitance of a first capacitive sensor formed by the first conductive mesh, second conductive mesh, and the first filter media.

In some embodiments, the capacitive sensor system further comprises a second filter media and a third conductive mesh, the second filter media being disposed between the second conductive mesh and the third conductive mesh, the second conductive mesh, second filter media, and third conductive mesh forming a second capacitive sensor.

In some embodiments, the capacitive sensor system further comprises a filter management controller configured to perform a comparison in a change in capacitance of the first capacitive sensor to a change in capacitance of the second capacitive sensor and to provide an indication of a fault of the capacitive sensor system responsive to a result of the comparison being indicative of improper functioning of the capacitive sensor system.

In some embodiments, the capacitive sensor system further comprises a filter management controller configured to perform a calculation of an amount of dust present in the first filter media from a measurement of capacitance of the first capacitive sensor.

In some embodiments, the capacitive sensor system further comprises a humidity monitor, the filter management controller being configured to include a humidity level measured by the humidity monitor in the calculation of the amount of dust present in the first filter media.

In some embodiments, the capacitive sensor system further comprises a display configured to provide an indication of an amount of dust present in the first filter media.

In some embodiments, the capacitive sensor system further comprises an alarm configured to provide an indication of the amount of dust present in the first filter exceeding a set point.

In some embodiments, the capacitive sensor system further comprises an interface with a HVAC system controller, the HVAC system controller being configured to adjust an operating parameter of the HVAC system responsive to a signal from the filter management controller indicative of the amount of dust present in the first filter media.

In accordance with another aspect, there is a provided a method of monitoring the buildup of dust in a filter of a HVAC system. The method comprises performing a measurement of a capacitance parameter of a capacitive sensor. The capacitive sensor comprises a first conductive mesh, a second conductive mesh, and a filter media disposed between the first conductive mesh and the second conductive mesh. The method further comprises performing a calculation of an amount of dust accumulated in the filter media from the measurement of the capacitance parameter.

In some embodiments, the method further comprises adjusting an operating parameter of the HVAC system responsive to a result of the calculation of the amount of dust accumulated in the filter media.

In some embodiments, the method further comprises providing an alert responsive to the capacitance parameter reaching a set point.

In some embodiments, the alert is provided responsive to a capacitance value of the capacitive sensor reaching a set point.

In some embodiments, the alert is provided responsive to a change in a capacitance value of the capacitive sensor reaching a set point.

In some embodiments, the alert is provided responsive to a rate of change of a capacitance value of the capacitive sensor reaching a set point.

In some embodiments, the alert is provided responsive to a rate of change of a rate of change of a capacitance value of the capacitive sensor reaching a set point.

In some embodiments, the method further comprises inspecting the filter media responsive to the alert.

In some embodiments, the method further comprises servicing the filter media responsive to the alert. Servicing the filter media may include cleaning or replacing the filter media.

In accordance with another aspect, there is provided a method of facilitating the efficient operation of a HVAC system. The method comprises performing a calculation to determine an amount of dust present in a filter of the HVAC system from a capacitance parameter of a capacitive sensor. The capacitive sensor comprises a first conductive mesh and a second conductive mesh. A filter media of the filter is disposed between the first conductive mesh and the second conductive mesh. The method further comprises servicing the filter of the HVAC system responsive to the amount of dust present in the filter exceeding an acceptable level.

In some embodiments, the method further comprises adjusting an operating parameter of the HVAC system responsive to the amount of dust present in the filter.

In some embodiments, the method further comprises calibrating the capacitive sensor to generate a calibration profile and determining the amount of dust present in the filter of the HVAC system by comparing the capacitance parameter of the capacitive sensor to the calibration profile.

BRIEF DESCRIPTION OF THE DRAWINGS

The accompanying drawings are not intended to be drawn to scale. In the drawings, each identical or nearly identical

DETAILED DESCRIPTION

Aspects and embodiments disclosed herein are not limited to the details of construction and the arrangement of components set forth in the following description or illustrated in the drawings. The disclosed aspect and embodiments are capable of being practiced or of being carried out in various ways. The phraseology and terminology used herein is for the purpose of description and should not be regarded as limiting. The use of "including," "comprising," "having," "containing," "involving," and variations thereof herein is meant to encompass the items listed thereafter and equivalents thereof.

Aspects and embodiments disclosed herein include systems and methods which may facilitate the efficient operation of a HVAC system. The efficient operation of a HVAC system may be facilitated by cleaning or replacing one or more air filters within the system before the filters become clogged to an extent that an undesirably high resistance to the passage of air through the filters is exhibited. High resistance to the passage of air through a HVAC system filter may require the HVAC system to operate with increased power, and thus, increased operating cost, to circulate air through the HVAC system at a desired velocity. The cleaning or replacing of air filters within a HVAC system before the filters accumulate undesirably high amounts of debris may also reduce the potential for undesirable materials, for example, bacteria or dust to be delivered through the HVAC system due to reduced particulate removal efficiency of the filters as they become clogged.

HVAC systems may be provided with numerous forms of air filters. HVAC air filters may include foam and/or fibrous materials which remove solid particulates such as dust, pollen, mold, and bacteria from air passing through the filters. The fibrous materials included in HVAC air filters may include, for example, paper, cotton, or fiberglass. In some instances, the filters may be impregnated with one or more substances which facilitate the removal of odorous materials from air passing through the filters, for example, activated carbon. In some instances, HVAC air filters may include air ionizers which utilize an applied static electric charge to attract dust and other particles into the filter material.

Many HVAC systems do not include air filter monitoring systems which may alert an operator of the system that filters within the system are becoming clogged and may be in need of cleaning or replacement. Rather, in many systems, HVAC filters are inspected on a periodic basis as part of a scheduled maintenance program. Such a system is non-optimal. In some instances, a higher than expected amount of dust or other particles may enter a HVAC system, for example, after a period of windy weather which may cause large amounts of dust and other particulate debris to become airborne and to enter an air inlet of a HVAC system. The HVAC system may then operate with filters which include an undesirably large amount of dust for a time prior to the next scheduled maintenance event. Conversely, in some instances, for example, during periods of relatively calm weather or periods during which a HVAC system is not heavily used, the air filters of the HVAC system may not require cleaning or replacement at a frequency dictated by a scheduled maintenance program. The inspection of HVAC air filters is often a labor intensive operation, and thus it may be desirable to provide a system and method to reduce the need to manually inspect HVAC air filters.

Some HAVC systems, however, do include some form of sensor system which might be utilized to monitor the state of an air filter of the HVAC system. One form of sensor system relies on the sensing of a differential pressure across an air filter in question. The differential pressure sensors in such systems typically include stress sensitive membrane structures. These structures typically have a restricted measurement range and low accuracy for sensing small pressure differentials. In another form of sensor system an air flow meter may monitor air flow through a portion of a HVAC system for a drop in air flow which may be indicative of a clogged filter. Changes in air flow, however, may also be due to other factors including, for example, how extensively the HVAC system is being utilized. For example, during late summer months as temperatures become cooler and air conditioning is demanded less the air flow through a HVAC system may drop. An air flow sensor system may misinterpret this drop in air flow as being indicative of a clogged air filter. Further, air flow meters typically include moving parts which may be subject to wear and to mechanical failure over time. In another form of sensor system an opto-electronic device may monitor air in a HVAC system for the presence of suspended particles. The amount of suspended particles in air within a HVAC system, however, may be more dependent upon the quality of air influent to the HVAC system than on a state of an air filter of the system.

In accordance with some aspects and embodiments disclosed herein there are provided systems and methods for remotely determining the state of a HVAC system air filter, for example, the degree to which the air filter has accumulated or become clogged with dust or other particulate debris (referred to collectively herein as "dust" for simplicity). These systems and methods may facilitate operating a HAVC system in a more efficient and cost effective manner by reducing the need to manually inspect HVAC air filters and to only clean or replace the air filters when the filters have become clogged to an extent such that cleaning or replacement of the filters is warranted. The disclosed systems and methods may reduce the chance of running a HVAC system with air filters that have become more clogged, and thus more resistive to air flow than desired as well as to reduce the need to unnecessary inspect air filters which are not yet significantly clogged and which may have significant remaining useful life. A reduction in the chance of running a HVAC system with air filters that have become undesirably clogged may also reduce the chance for extended downtime of the HVAC system which might be warranted to remove dust which should have been removed by the air filter but instead settled on internal portions of ducting of the system. The disclosed systems and methods may also provide for a quick response to an air filter fault in a critical HVAC implementation, for example, a HVAC system used in data center cooling where loss of cooling capacity may result in degradation of performance or damage to equipment within the data center. The disclosed systems and methods may be more accurate and cost effective than previously known systems which might be utilized to monitor the state of an air filter of a HVAC system.

In accordance with some aspects, a capacitive sensor may be utilized to provide an indication of the degree to which a HVAC air filter has accumulated dust. The sensor may include conductive meshes separated by filtration material of the HVAC air filter. The capacitance of a capacitor formed by the conductive meshes and filtration material may be monitored. Accumulation of dust within the filtration material may cause a change in the capacitance of the conductive mesh/filtration material capacitor. The capacitive sensor may be calibrated by comparing an amount of dust accumulated in the filter and/or a reduction in air permeability of the filter to a change in capacitance of the conductive mesh/filtration material capacitor from a baseline capacitance observed with a new clean filter. The filter may be cleaned or replaced when the capacitance of the capacitive sensor indicates that the filter has accumulated sufficient dust or has become clogged to a degree that cleaning or replacement of the filter is deemed desirable. In some embodiments, the conductive mesh/filtration material capacitor may be monitored by a system which provides an indication of the percentage of an acceptable upper limit or set point for an amount of dust which has accumulated in a HVAC air filter and which may provide an alarm when an unacceptable amount of dust has accumulated in the filter.

Figure 1:
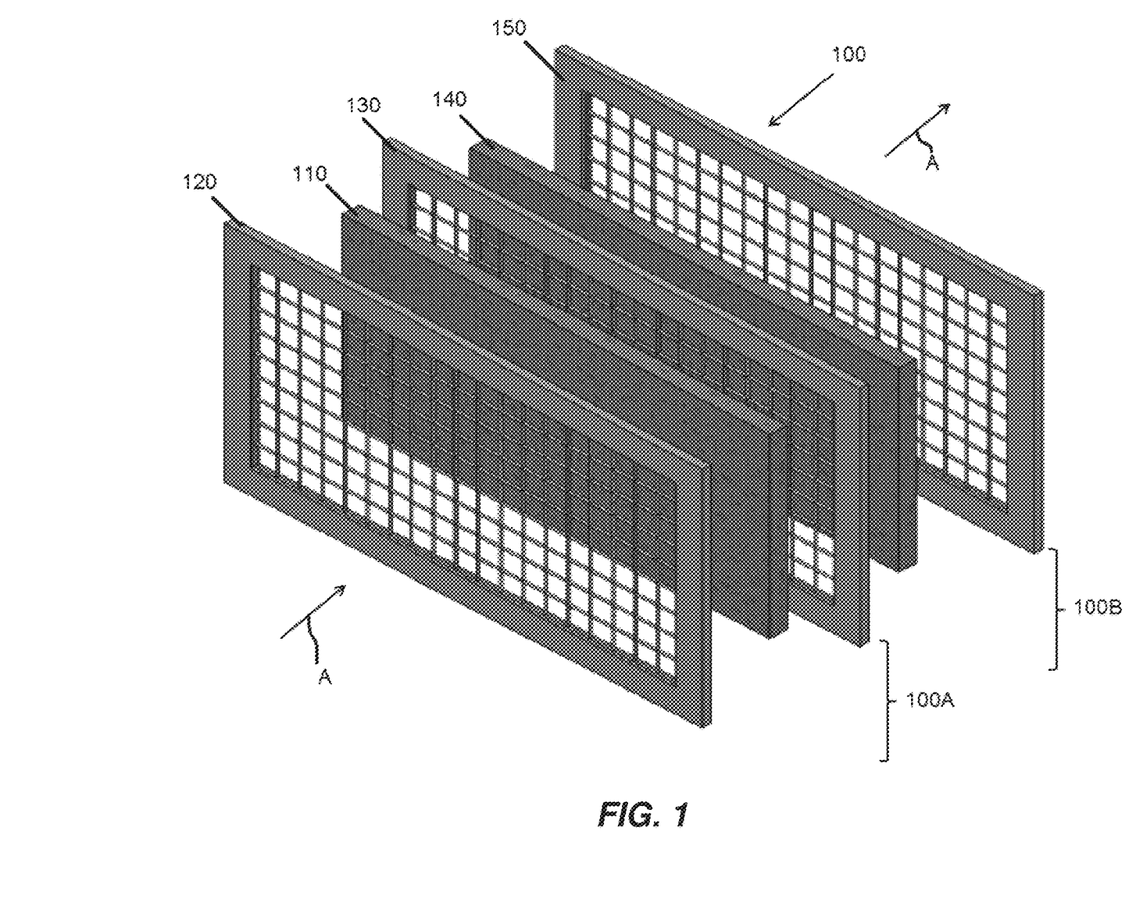
FIG. 1 is an isometric exploded view of an embodiment of a capacitive dust sensor assembly.

An embodiment of a capacitive dust sensor assembly is illustrated at 100 in FIG. 1. The capacitive dust sensor assembly 100 includes two capacitive sensors, an outer, or upstream, sensor 100A and an inner, or downstream, sensor 100B. The upstream sensor 100A is on a side of the assembly into which air to be filtered enters. The downstream sensor 100B is on a side of the assembly through which filtered air exits. Arrows A indicate the direction of air flow through the capacitive dust sensor assembly 100. The upstream sensor 100A includes a first filter media 110 disposed between a first conductive mesh 120 and a second conductive mesh 130. The downstream sensor 100B includes a second filter media 140 disposed between the second conductive mesh 130 and a third conductive mesh 150. The conductive meshes 120 and 130 form the plates of the upstream capacitive sensor 100A. The conductive meshes 130 and 150 form the plates of the downstream capacitive sensor 100B.

The conductive meshes 120, 130, 150 may be in the form of screens which provide for the passage of air though the meshes with little resistance. The conductive meshes 120, 130, 150 may be formed of any conductive material which may be used to form a plate of a capacitor. The conductive meshes 120, 130, 150 may, for example, be formed of insulated or non-insulted wire supported by a frame about the perimeter of the mesh, or may be formed of insulated or non-insulated strips of a metal or other conductive material. The conductive meshes 120, 130, 150 are illustrated in FIG. 1 as being identically shaped, but may in some embodiments be shaped differently from one another or may be formed of different material(s) from one another. The conductive meshes 120, 130, 150 may include a regular array of conductors defining rectangular apertures as illustrated in FIG. 1, or may be provided in different configurations in different embodiments. Apertures defined by the conductive meshes may be in different shapes than illustrated, for example, circular, oval, hexagonal, or any other regular or irregular shape.

The filter media 110, 140 may be formed of any material which may remove dust from air passing through the filter media. The filter media 110, 140 may be formed of any one or more of the materials discussed above from which HVAC filters may be formed, for example, foam, paper, cotton, or fiberglass. The first filter media 110 and the second filter media 140 are illustrated in FIG. 1 as being identically shaped, however, in some embodiments, the filter media 110, 140 may be shaped differently from one another, may have different thicknesses, or may be formed of different material(s) from one another. Further, although illustrated in FIG. 1 as being substantially flat rectangular sheets of material the filter media 110, 140 may be formed in various shapes in different embodiments, for example, as a circle, oval, or any regular or irregular polygon and with thicknesses as desired for a particular implementation. In some embodiments, the filter media 110, 140 may be pleated. In some embodiments, the filter media may form a three dimensional structure, for example a cylinder, rather than being a flat sheet. When formed as a cylinder, conductive meshes may be disposed on inner and outer walls of the filter material to form a capacitive sensor. Embodiments of the filter media are not limited to having any particular size, shape, or configuration unless explicitly set forth herein.

In use, the conductive meshes 120, 130, 150 are electrically coupled to a circuit which measures the capacitance between the plates of the upstream and downstream sensors 100A, 100B. The circuit may include, for example, a signal oscillator which generates a variable frequency signal having a frequency dependent upon the capacitance of the upstream and/or downstream sensors 100A, 100B.

When provided with fresh, unsoiled filter media 110, 140, the upstream and downstream sensors 100A, 100B exhibit initial capacitance values which depend on factors such as the areas of the conductive meshes 120, 130, 150, the distance between the conductive meshes 120, 130, 150, and the dielectric constant(s) of the filter media 110, 140. The capacitance of the upstream and downstream sensors 100A, 100B will change as dust gradually accumulates in the filter media 110, 140. The capacitance of the upstream and downstream sensors 100A, 100B will typically increase as dust accumulates in the filter media 110, 140 because materials which make up dust typically have dielectric constants higher than that of air. As dust displaces air in the filter media 110, 140, the dielectric constant of the soiled filter media 110, 140 will increase, thus increasing the capacitance of the upstream and downstream sensors 100A, 100B from their initial capacitance values.

In some embodiments, the downstream sensor 100B may be used as a calibrating sensor to verify the proper functioning of the upstream sensor 100A. As dust accumulates in the filter media 110, 140, the first filter media 110 will become increasingly clogged and will allow less dust to pass though to the second filter media 140. The capacitance of both the upstream and downstream sensors 100A, 100B will thus initially increase, but the rate of increase in capacitance will decrease over time as the filter media 110, 140 become saturated with dust and thus become less efficient at accumulating additional dust. If one of the upstream and downstream sensors 100A, 100B continue to exhibit increasing capacitance over time while the other of the upstream and downstream sensors 100A, 100B exhibits a relatively constant capacitance over time, this may be indicative of a fault with one of the upstream and downstream sensors 100A, 100B. A system monitoring the assembly 100 may produce an alarm indicating to an operator that the capacitive dust sensor assembly 100 may be exhibiting a fault and should be inspected. In some embodiments, however, the downstream sensor 100B may be omitted, and the capacitive dust sensor assembly may operate with only the upstream sensor 100A.

The upstream and/or downstream sensors 100A, 100B may be calibrated to determine under what conditions the filter media 110 and/or 140 should be cleaned or replaced. The calibration test(s) may be performed upon initial installation of the assembly and may be repeated as part of a scheduled maintenance program or upon the occurrence of events such as the cleaning or replacement of one of the filter media 110 and/or 140. Tests may be performed where a resistance to air flow through the assembly 100 is correlated with one or more capacitance parameters including any one or more of an absolute capacitance of one or both of the upstream and downstream sensors 100A, 100B, a change in capacitance from an initial value observed with clean filter media of one or both of the upstream and downstream sensors 100A, 100B, a rate of change in capacitance over time (a first derivative of the capacitance value with respect to time) of one or both of the upstream and downstream sensors 100A, 100B, or a change in the rate of change in capacitance over time (a second derivative of the capacitance value with respect to time) of one or both of the upstream and downstream sensors 100A, 100B. In some embodiments, capacitance of the sensors 100A, 100B may vary with humidity. Thus, in some embodiments, the calibration of the sensors may include creating a model using both humidity and one or more capacitance parameters as inputs to determine an amount of dust accumulated on or in the capacitive dust sensor assembly 100.

For calibration purposes, the resistance to air flow of the capacitive dust sensor assembly 100 may be measured by, for example, a measurement of a difference in pressure on opposite sides of the assembly when a flow of air is directed through the capacitive dust sensor assembly 100, and/or by a measurement of a flow rate of air through the capacitive dust sensor assembly 100 when air at an operating pressure of the HVAC system in which the assembly 100 is installed is applied to the capacitive dust sensor assembly 100.

In operation, when one or more capacitance parameters of one or both of the upstream and downstream sensors 100A, 100B reach set points or values indicative of an amount of dust accumulated in the sensors 1000A and/or 100B which is expected to cause a decrease in air flow through the assembly 100 or an increase in resistance to air flow of the assembly 100 which warrants cleaning or replacement of the filter media 110 and/or 140 a system monitoring the assembly 100 may provide an alert or alarm to an operator of the HVAC system. Responsive to the alert or alarm, the operator may inspect the assembly 100 to verify that the filter media 110 and/or 140 should be cleaned or replaced, and may clean or replace the filter media 110 and/or 140 if such cleaning or replacement is warranted.

Figure 2:
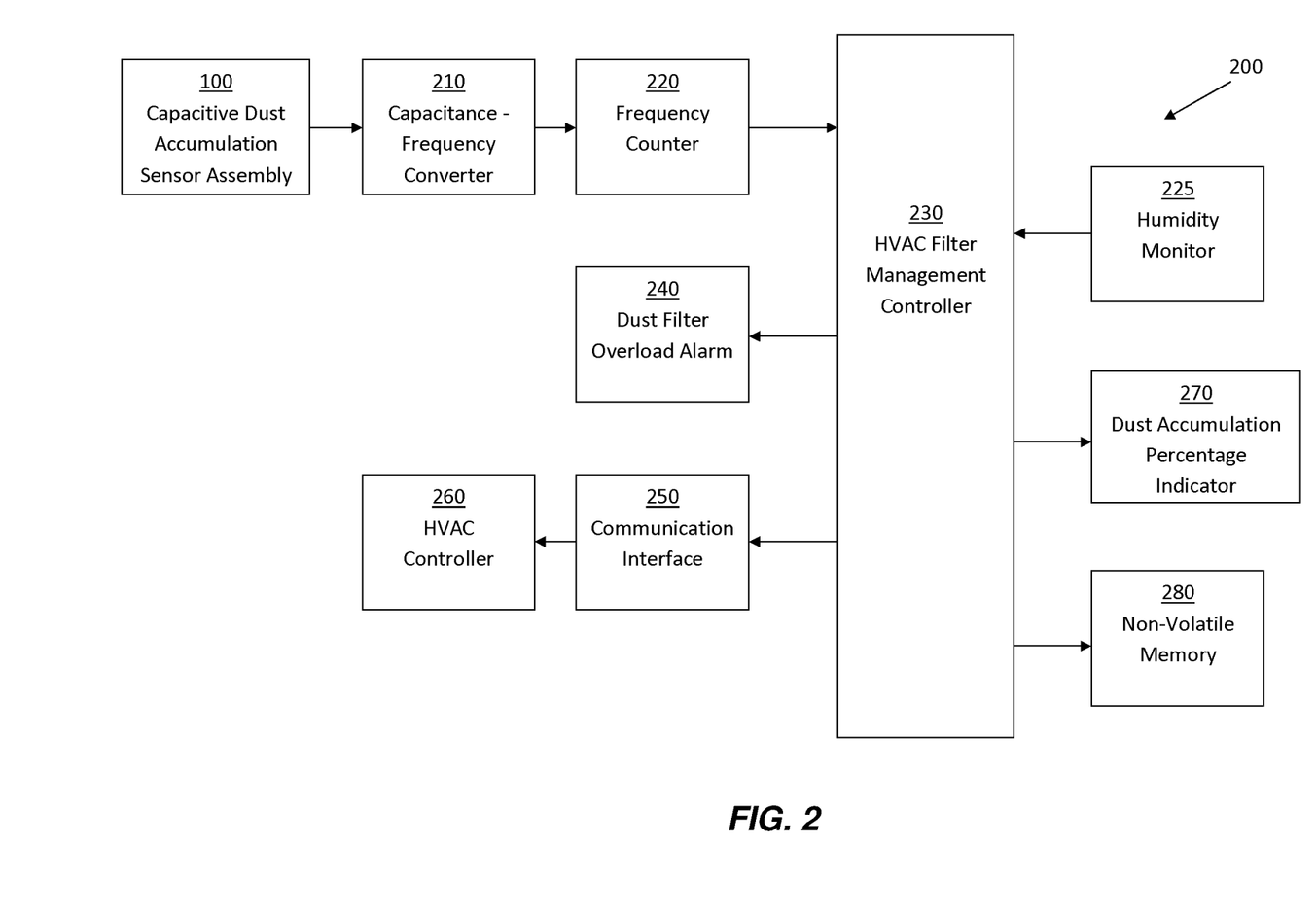
FIG. 2 is block diagram of an embodiment of a control system for a capacitive dust sensor assembly.

A block diagram of an embodiment of a controller for the capacitive dust sensor assembly 100 is illustrated in FIG. 2, indicated generally at 200. In operation, the upstream and/or downstream sensors 100A, 100B of the capacitive dust sensor assembly 100 exhibit capacitance values dependent upon an amount dust accumulation in the filter media 110 and/or 140 and in some embodiments, on humidity or some other external factor. A capacitance-to-frequency converter 210 measures the capacitance values from the upstream and/or downstream sensors 100A, 100B and generates a signal having a frequency proportional to the measured capacitance value(s). The variation in the frequency of the signal generated by the capacitance to frequency converter 210 is measured by frequency counter 220 or a microcontroller in a HVAC filter management controller 230. If the frequency of the signal generated by the capacitance to frequency converter 210 is increasing with time, this may be indicative of dust accumulating in the filter media 110 and/or 140 of the capacitive dust sensor assembly 100. The microcontroller stores an indication of a change (or lack thereof) in frequency of the signal generated by the capacitance to frequency converter 210 in a non-volatile memory 280, for example, a flash memory or hard drive. The microcontroller may also generate a database profile to track dust accumulation rate and a percentage of dust accumulation relative to an acceptable upper limit to be able to analyze trends in the accumulation of dust in the capacitive dust sensor assembly 100. A humidity monitor 225 may provide an indication of humidity in the HVAC system to the HVAC filter management controller 230 so the HVAC filter management controller 230 can compensate for effects of humidity when calculating an amount of dust accumulation in the filter media 110 and/or 140 of the capacitive dust sensor assembly 100 from the frequency of the signal generated by the capacitance to frequency converter 210. The dust accumulation percentage is displayed to an operator of the HVAC system through a dust accumulation percentage indicator 270 so that the operator may plan for preventive maintenance of the HVAC system. The HVAC filter management controller 230 will generate an alarm signal 240 if the filter media 110 and/or 140 becomes overloaded with dust and requires maintenance. The HVAC filter management controller 230 may also send an indication of the measured percentage of dust accumulation to a controller of the HVAC system 260 through a communication interface 250 so that the HVAC controller can compensate for reduced airflow as the filter media 110 and/or 140 accumulate dust by adjusting an operating parameter of the HVAC system, for example, by increasing the air pressure in a portion of the HAVC system including the capacitive dust sensor assembly 100.

Figure 3:
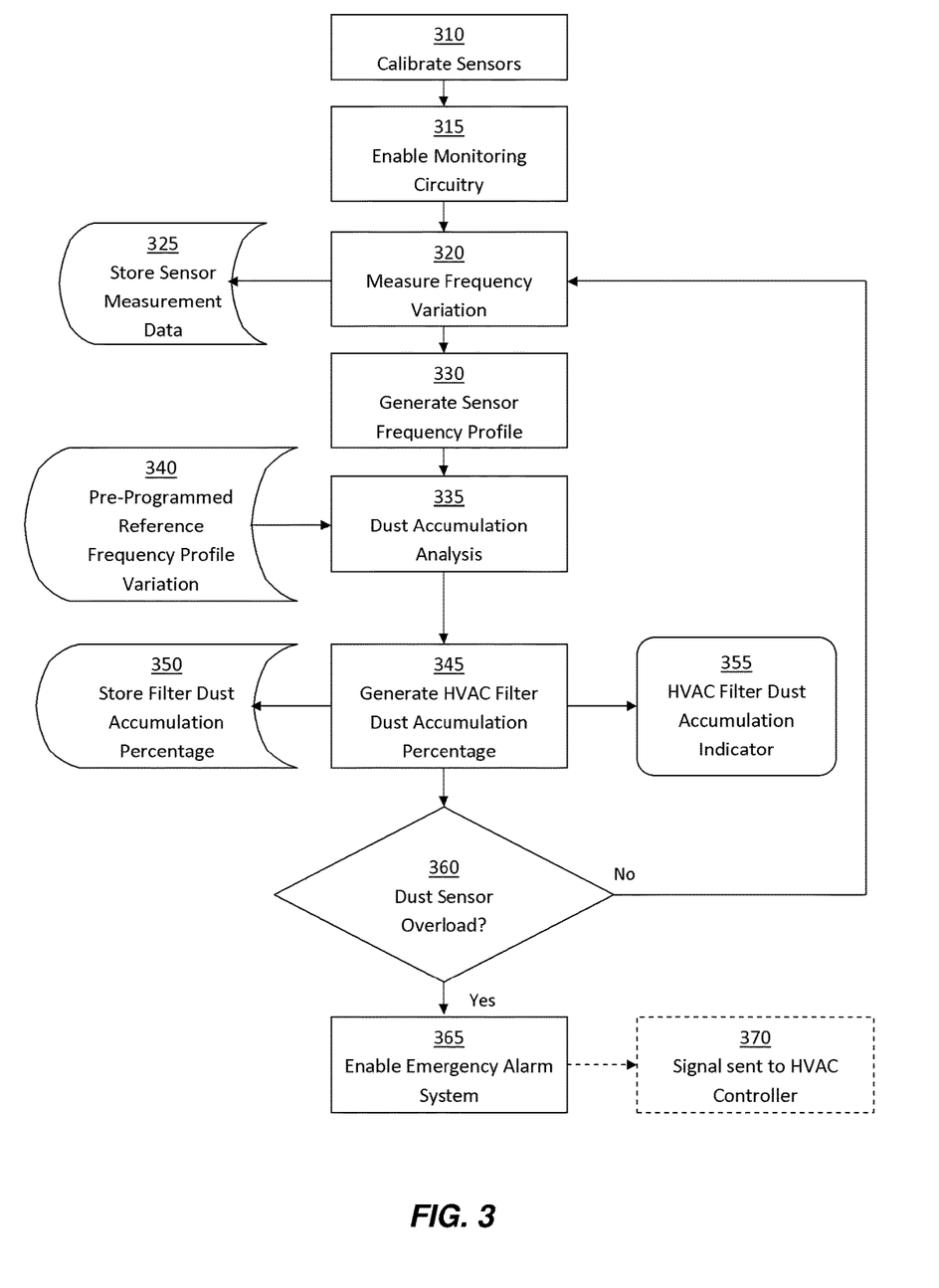
FIG. 3 is a flowchart of an embodiment of a method disclosed herein.

An embodiment of a method for operating a HVAC system is illustrated in the flowchart of FIG. 3. In act 310 calibration of the capacitive dust sensor assembly 100 is performed to generate a profile associating capacitance measurements from the capacitive dust sensor assembly 100, and in some embodiments, humidity, with an amount of dust accumulation and/or air permeability and/or pressure drop across the capacitive dust sensor assembly 100. Once the calibration profile has been generated and the capacitive dust sensor assembly 100 is ready for operation, circuitry for monitoring the capacitive dust sensor assembly 100, including, for example, the capacitance to frequency converter 210, frequency counter 220, and HVAC filter management controller 230 is activated (act 315).

In act 320 data regarding the change (or lack thereof) in frequency of a signal generated from the capacitance to frequency converter 210 is monitored and stored in non-volatile memory 280 (act 325). In act 330 the HVAC filter management controller 230 analyzes the signal generated from the capacitance to frequency converter 210, and in some embodiments a signal from the humidity monitor 225, to generate a dust accumulation profile, for example, an estimate of an amount of dust or a change in amount of dust accumulated in the capacitive dust sensor assembly 100.

The dust accumulation profile may be generated by comparing the signal generated from the capacitance to frequency converter 210 to the calibration profile 340 generated in act 310. In act 345 the HVAC filter management controller 230 utilizes the generated dust accumulation profile to calculate the percentage of a total acceptable amount of dust accumulation that has accumulated in the capacitive dust sensor assembly 100. This percentage may be provided to a monitor 355 associated with the HVAC system for an operator to view and data indicative of the calculated percentage may be stored in the non-volatile memory 280.

If the calculated dust accumulation percentage is at or above 100% of a total acceptable dust accumulation level, the HVAC filter management controller 230 may provide an alarm to an operator of the HVAC system (act 365) that the capacitive dust sensor assembly 100 is in need of maintenance, for example, to clean or replace one or both of the filter media 110 and/or 140. The HVAC filter management controller 230 may also provide a signal to a controller of the HVAC system (act 370) to, for example, disable or reroute air flow around the section of the HVAC system in which the capacitive dust sensor assembly 100 is installed until maintenance of the capacitive dust sensor assembly 100 has been completed. The HVAC filter management controller 230 may also provide a signal to a controller of the HVAC system after calculating the dust accumulation percentage in act 345 so that the HVAC controller may adjust parameters of the system, for example, air pressure applied through the capacitive dust sensor assembly 100 to maintain a desired air flow rate through the capacitive dust sensor assembly 100. If the calculated dust accumulation percentage is below the total acceptable dust accumulation level, the method returns to act 320 where the signal from the capacitance to frequency converter 210 is again checked to determine an amount of dust accumulation in the capacitive dust sensor assembly 100.

Example

A prototype of a capacitive dust sensor assembly was assembled which included a pair of metal grids coated with a plastic resin to provide electrical insulation between the pair of grids. The pair of metal grids were mounted on opposite sides of an insulating separator. No filter media was used in the prototype; dust accumulated on the metal grids themselves. The initial capacitance of the capacitor formed by the two metal grids separated by the insulating separator was measured to be about 85 pF.

Dusty air was flowed through the prototype dust sensor for a period of time until there was a visible accumulation of dust on the pair of metal grids. Capacitance measurements were taken on the soiled prototype dust sensor. The capacitance of the soiled sensor was measured to be 150 pF at 40% relative humidity and 300 pF at 85% relative humidity.

These results illustrate that a capacitive dust sensor assembly as described herein will exhibit a change in capacitance as it accumulates dust. These results also indicate that humidity may be an important factor in modeling the amount of dust accumulation in a capacitive dust sensor assembly as a function of capacitance of the assembly.

Having thus described several aspects of at least one embodiment of this invention, it is to be appreciated various alterations, modifications, and improvements will readily occur to those skilled in the art. For example, it is to be appreciated that any of the features of any of the embodiments disclosed herein may be combined or substituted for features of any other embodiment disclosed herein. Acts of the method disclosed may be performed in alternate orders and one or more acts may be added to or omitted from the method or substituted by one or more alternative acts. Such alterations, modifications, and improvements are intended to be part of this disclosure, and are intended to be within the scope of the disclosure. Accordingly, the foregoing description and drawings are by way of example only.

What is claimed is:

1. A capacitive sensor system for detecting accumulation of dust in a filter of a HVAC system, the sensor system comprising:
    a first conductive mesh;
    a second conductive mesh;
    a first filter media disposed between the first conductive mesh and the second conductive mesh; and
    a circuit configured to measure a capacitance of a first capacitive sensor formed by the first conductive mesh, second conductive mesh, and the first filter media and to translate a measured capacitance to a dust level indicator frequency that is used to determine a frequency corresponding to level of dust.

2. The capacitive sensor system of claim 1, further comprising a second filter media and a third conductive mesh, the second filter media being disposed between the second conductive mesh and the third conductive mesh, the second conductive mesh, second filter media, and third conductive mesh forming a second capacitive sensor.

3. The capacitive sensor system of claim 2, further comprising a filter management controller configured to perform a comparison in a change in capacitance of the first capacitive sensor to a change in capacitance of the second capacitive sensor and to provide an indication of a fault of the capacitive sensor system responsive to a result of the comparison being indicative of improper functioning of the capacitive sensor system.

4. The capacitive sensor system of claim 1, further comprising a filter management controller configured to perform a calculation of an amount of dust present in the first filter media from a measurement of capacitance of the first capacitive sensor.

5. The capacitive sensor system of claim 4, further comprising a humidity monitor, the filter management controller being configured to include a humidity level measured by the humidity monitor in the calculation of the amount of dust present in the first filter media.

6. The capacitive sensor system of claim 4, further comprising a display configured to provide an indication of an amount of dust present in the first filter media.

7. The capacitive sensor system of claim 4, further comprising an alarm configured to provide an indication of the amount of dust present in the first filter exceeding a set point.

8. The capacitive sensor system of claim 4, further comprising an interface with a HVAC system controller, the HVAC system controller configured to adjust an operating parameter of the HVAC system responsive to a signal from the filter management controller indicative of the amount of dust present in the first filter media.

9. A method of monitoring the buildup of dust in a filter of a HVAC system, the method comprising:
    performing a measurement of a capacitance parameter of a capacitive sensor comprising
        a first conductive mesh,
        a second conductive mesh, and
        a filter media disposed between the first conductive mesh and the second conductive mesh; and
    performing a calculation of an amount of dust accumulated in the filter media from the measurement of the capacitance parameter by translating a measured capacitance to a dust level indicator frequency that is used to determine a frequency corresponding to level of dust.

10. The method of claim 9, further comprising adjusting an operating parameter of the HVAC system responsive to a result of the calculation of the amount of dust accumulated in the filter media.

11. The method of claim 9, further comprising providing an alert responsive to the capacitance parameter reaching a set point.

12. The method of claim 11, wherein the alert is provided responsive to a capacitance value of the capacitive sensor reaching a set point.

13. The method of claim 11, wherein the alert is provided responsive to a change in a capacitance value of the capacitive sensor reaching a set point.

14. The method of claim 11, wherein the alert is provided responsive to a rate of change of a capacitance value of the capacitive sensor reaching a set point.

15. The method of claim 11, wherein the alert is provided responsive to a rate of change of a rate of change of a capacitance value of the capacitive sensor reaching a set point.

16. The method of claim 11, further comprising inspecting the filter media responsive to the alert.

17. A method of facilitating the efficient operation of a HVAC system, the method comprising:
 performing a calculation to determine an amount of dust present in a filter of the HVAC system from a capacitance parameter of a capacitive sensor comprising
   a first conductive mesh,
   a second conductive mesh, and
   a filter media of the filter disposed between the first conductive mesh and the second conductive mesh; and
 servicing the filter of the HVAC system responsive to the amount of dust present in the filter exceeding an acceptable level by translating a measured capacitance to a dust level indicator frequency that is used to determine a frequency corresponding to level of dust.

18. The method of claim 17, further comprising adjusting an operating parameter of the HVAC system responsive to the amount of dust present in the filter.

19. The method of claim 17, further comprising calibrating the capacitive sensor to generate a calibration profile and determining the amount of dust present in the filter of the HVAC system by comparing the capacitance parameter of the capacitive sensor to the calibration profile.

* * * * *